United States Patent
Landino et al.

(10) Patent No.: US 9,145,113 B2
(45) Date of Patent: Sep. 29, 2015

(54) TRANSMISSION PARKING PAWL ACTUATION ASSEMBLY

(71) Applicant: GM Global Technology Operations LLC, Detroit, MI (US)

(72) Inventors: Christopher J. Landino, Sterling Heights, MI (US); Stephen W. Powell, South Lyon, MI (US)

(73) Assignee: GM Global Technology Operations LLC, Detroit, MI (US)

(*) Notice: Subject to any disclaimer, the term of this patent is extended or adjusted under 35 U.S.C. 154(b) by 144 days.

(21) Appl. No.: 13/902,046

(22) Filed: May 24, 2013

(65) Prior Publication Data

US 2014/0346004 A1 Nov. 27, 2014

(51) Int. Cl.
*F16H 63/34* (2006.01)
*B60T 1/00* (2006.01)
*F16H 25/08* (2006.01)
*F16D 63/00* (2006.01)

(52) U.S. Cl.
CPC ............. *B60T 1/005* (2013.01); *F16D 63/006* (2013.01); *F16H 25/08* (2013.01); *F16H 63/3433* (2013.01)

(58) Field of Classification Search
CPC . F16H 63/34; F16H 63/3416; F16H 63/3425; F16H 63/3458; F16H 63/3466; F16H 63/3475; F16H 63/3483; F16H 63/3491
USPC ............................................ 192/219.5, 219.6
See application file for complete search history.

(56) References Cited

U.S. PATENT DOCUMENTS

| 2,008,140 | A | | 7/1935 | Matson | |
|---|---|---|---|---|---|
| 2,166,512 | A | | 7/1939 | Warwick | |
| 2,954,103 | A | * | 9/1960 | Sand | 188/69 |
| 3,703,941 | A | * | 11/1972 | Ohie et al. | 188/31 |
| 3,990,541 | A | * | 11/1976 | Dobrinska et al. | 188/31 |
| 4,252,219 | A | * | 2/1981 | Kauffman | 188/69 |
| 6,725,962 | B1 | * | 4/2004 | Fukuda | 180/292 |
| 2001/0045337 | A1 | * | 11/2001 | Ono | 192/219.5 |
| 2009/0193931 | A1 | * | 8/2009 | Burgardt et al. | 74/577 M |

* cited by examiner

*Primary Examiner* — Richard Lorence

(57) ABSTRACT

A parking pawl actuation assembly for a transmission includes a shaft, a hub member rotatably supported by the shaft, a cam plate and lever plate rotatably supported by the hub member, a first resilient member disposed between the cam plate and the lever plate, and wherein the resilient member applies a rotational force on the cam plate in a first rotational direction when the lever plate is rotated in the first rotational direction, an actuator configured to selectively rotate the lever plate to one of a plurality of positions, and a parking pawl member configured to engage the cam plate and the parking gear of the transmission.

38 Claims, 4 Drawing Sheets

TRANSMISSION PARKING PAWL ACTUATION ASSEMBLY

TECHNICAL FIELD

The invention relates to an actuated parking pawl assembly for an automatic transmission, and more particularly to an actuated parking pawl assembly for use with an electronic transmission range selection system.

BACKGROUND

The statements in this section merely provide background information related to the present disclosure and may or may not constitute prior art.

A typical transmission includes a parking gear and pawl to lock the transmission and the remainder of the drive train thus preventing the vehicle from rolling from the original parked position even when the vehicle is parked on a steep grade. Mechanisms designed to engage a parking lock on an output shaft of a transmission include direct acting actuators or systems having mechanical linkages to prevent the rotation of the output shaft. Including this feature in a transmission adds complexity, weight, cost and package size without adding to the overall performance of the transmission while it is in operation. As transmissions become more efficient in packing space and performance the space and weight available of other component assemblies is decreased.

While previous transmissions having parking pawl actuation assemblies are useful for their intended purpose, the need for new and improved parking pawl actuation assemblies within transmissions which exhibit improved performance, especially from the standpoints of reducing complexity, improving assembly processes, reducing weight, reducing cost, and reducing overall package size is essentially constant. Accordingly, there is a need for an improved, cost-effective parking pawl actuation assembly for use in a transmission.

SUMMARY

A parking pawl actuation assembly for a transmission is provided. The assembly includes a shaft, a hub member, a cam plate, a lever plate, a first resilient member, an actuator, and a parking pawl member. The shaft has a first and second end. The second end is rotatably supported by a housing of the transmission. The hub member has a first and second end. The hub member is rotatably supported by the shaft, the first end of the hub member is disposed proximate the first end of the shaft, and the second end of the hub member is disposed proximate the second end of the shaft. The cam plate is rotatably supported by the hub member and disposed proximate the second end of the hub member. The lever plate is rotatably supported by the hub member and disposed adjacent the cam plate. The first resilient member is disposed between the cam plate and the lever plate. The resilient member applies a rotational force on the cam plate in a first rotational direction when the lever plate is rotated in the first rotational direction. The actuator is configured to selectively rotate the lever plate to one of a plurality of positions. The parking pawl member has a first end and a second end. The first end of the parking pawl member is pivotably supported by the transmission housing and the second end of the parking pawl member has a first portion configured to engage the cam plate and a second portion configured to engage a parking gear of the transmission.

In one example of the present invention; the parking pawl actuation assembly further includes a spring plate, a second resilient member, a release member. The spring plate fixed for common rotation with the hub member and disposed adjacent the lever plate. The second resilient member disposed between the transmission housing and the spring plate. The second resilient member has a first and a second end, the first end configured to engage the spring plate and the second end configured to engage the housing of the transmission, and wherein the second resilient member applies a detent force to the spring plate when the spring plate is rotated. The release member is disposed on the shaft proximate the first end of the shaft. The release member is configured to engage the shaft for common rotation. The shaft and the hub member are fixed for common rotation. The spring plate is configured to engage the lever plate for common rotation when the spring plate is rotated in a second rotational direction opposite the first rotational direction and the lever plate is configured to engage the cam plate for common rotation when the lever plate is rotated in the second rotational direction.

In another example of the present invention, the shaft includes a flange, a narrow portion, and a flat portion. The flange is disposed on the first end, the flat portion is disposed proximate the second end, and the narrow portion is disposed between the first and second ends and includes a bore having an axis perpendicular to an axis of the shaft.

In yet another example of the present invention, the hub member includes a axial bore, a radial bore, a flange, a first surface, and a second surface. The axial bore receives the shaft, flange is disposed on the first end, the first surface is disposed proximate the flange, the second surface is disposed proximate the second end and the radial bore intersects the second surface and has an axis perpendicular to the axis of the hub member.

In yet another example of the present invention, the cam plate includes an outer perimeter surface having a first, a second, a third, and a fourth portion. The diameter of the first portion is a constant value, the diameter of the second portion is a constant value that is larger than the diameter of the first portion, the diameter of the fourth portion varies and forms a planar surface, and the diameter of the third portion varies from the diameter of the second portion to the diameter of an adjacent edge of the fourth portion.

In yet another example of the present invention, the cam plate further includes a first and second radially extending surface. The first radial surface is disposed adjacent the first portion and includes a protrusion, and the second radial surface is disposed adjacent the first portion and the second portion.

In yet another example of the present invention, the lever plate includes a first, a second, and a third arm. The first arm extends radially outward from the hub member and includes an end portion that extends toward the cam plate, the second arm extends in a radial direction at approximately 90° from the first arm, and the third arm extends from the second arm and includes an end portion that extends towards the cam plate and includes a protrusion.

In yet another example of the present invention, the first arm of the lever plate includes a pin disposed extending in an axially direction opposite the cam plate.

In yet another example of the present invention, the spring plate includes a first and a second arm extending radially at an angle of approximately 55° to 75°.

In yet another example of the present invention, the release member has a first and a second end. The first end includes a bore that receives the shaft, and the second end is configured to receive a manually operated cable.

In yet another example of the present invention, the lever plate is selectively rotated by the actuator to one of a first, a second, and a third of the plurality of positions. The first position includes the lever plate and the cam plate rotated in the second rotational direction, the first portion of the parking pawl is in contact with the second surface portion of the cam plate, and the second portion of the parking pawl is separated from the parking gear.

In yet another example of the present invention, the second of the plurality of positions includes the lever plate and the cam plate rotated in the first rotational direction, the first portion of the parking pawl is in contact with the fourth surface portion of the cam plate, and the second portion of the parking pawl is disposed between a pair of gear teeth of the parking gear.

In yet another example of the present invention, the third of the plurality of positions includes the lever plate rotated in the second rotational direction, the first portion of the parking pawl is in contact with the third surface portion of the cam plate, and the second portion of the parking pawl is in contact with a top surface of a gear tooth of the parking gear.

Further features and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
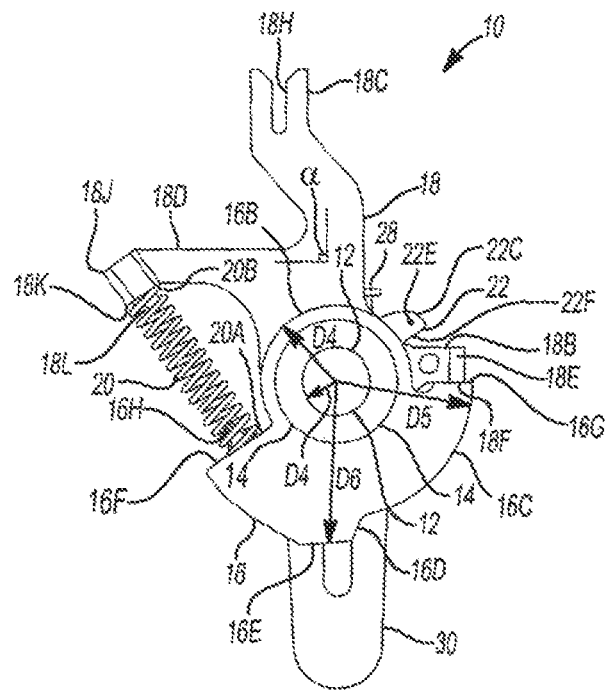
FIG. 1A is a front view of a parking pawl actuation assembly according to the principles of the present invention.
Figure 1B:
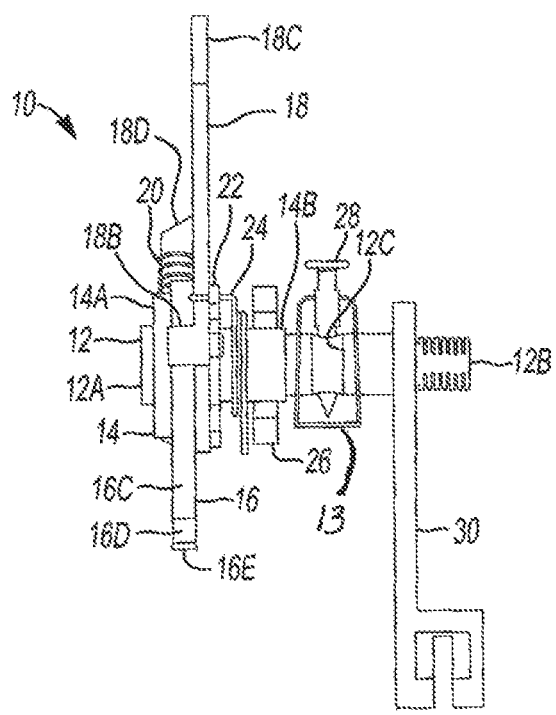
FIG. 1B is a side view of a parking pawl actuation assembly according to the principles of the present invention.
Figure 1C:
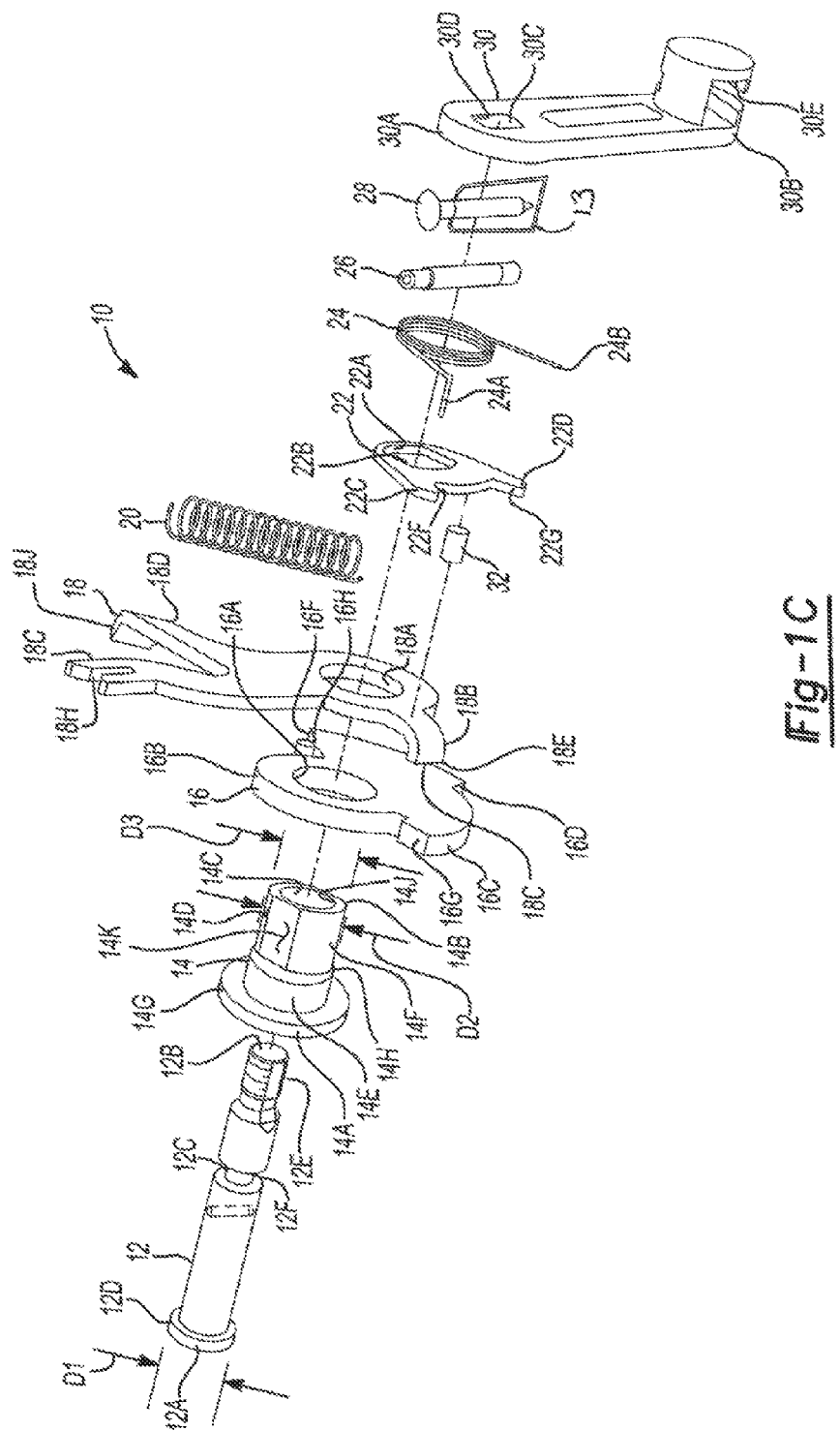
FIG. 1C is an exploded perspective view of a parking pawl actuation assembly according to the principles of the present invention.

With reference to FIGS. 1A-1C, a parking pawl actuation assembly for a transmission according to the principles of the present invention is generally indicated by reference number 10. The parking pawl actuation assembly 10 includes a shaft 12 supported by a housing of the transmission 13, a hub 14, a cam plate 16, a lever plate 18, a compression spring 20, a spring plate 22, a spring 24, a first and second pin 26, 28 and a manual release lever 30. More specifically, the hub 14 is supported by the shaft 12 and is further coupled to the shaft 12 with the pin 26. The cam plate 16 and lever plate 18 are rotatably supported by the hub 14 so that the cam plate 16 can move freely relative to the hub 14 and the lever plate 18. The lever plate 18 is also free to rotate relative to the hub 14. A compression spring 20 is disposed between the cam plate 16 and the lever plate 18. The compression spring 20 is arranged to create and angular compression force between the cam plate 16 and the lever plate 18 when the cam plate 16 is rotated in the clockwise direction relative to the lever plate 18.

The spring plate 22 is disposed on and fixed for common rotation to the hub 14 adjacent to the lever plate 18. The spring 24 is disposed adjacent to the spring plate 22 and includes a first end 24A fixed to the spring plate 22 and a second end 24B that is grounded. The first pin 26 that couples the hub 14 to the shaft 12 is disposed adjacent the spring 24 thus axially securing the spring 24 on the hub 14. The second pin 28 is disposed in a hole of the shaft 12 and the transmission housing 13 to retain the assembly 10 in the transmission housing 13. The manual release lever 20 is fixed for common rotation to the shaft 12.

With continuing reference to FIG. 1A-C, the individual components of the assembly 10 are explained in more detail including additional attention given to the interaction of the components during the functioning of the assembly. For example, the shaft 12 includes a first end 12A, a second end 12B, and a narrow portion 12C. The first end 12A has a flange 12D with a diameter D1 which abuts the hub 14 to prevent the hub 14 from further axial movement. The second end 12B includes a pair of flat portions 12E. The narrow portion 12C includes a bore 12F that receives the pin 26.

The hub 14 includes a first end 14A, a second end 14B, an axial first bore 14C, a radial second bore 14D, a first surface 14E having a diameter D2, and a second surface 14F having a diameter D3. The first end 14A includes a flange 14G that abuts the flange 12D of the shaft 12. The diameter D2 of the first surface 14E is larger than the diameter D3 of the second surface 14F and a shoulder or step 14H is formed where the first surface 14E and the second surface 14F meet. Additionally, the second surface 14F includes a pair of flat surfaces 14K. The first bore 14C runs the length of the hub 14 and is open at the first and second ends 14A, 14B. The second bore 14D is disposed proximate the second end 14B such that the second surface 14F communicates with an interior surface 14J of the first bore 14C. The second bore 14D is also aligned with the bore 12F of the shaft 12 such that the pin 26 is disposed in each of the second bore 14D of the hub 14 and the bore 12F of the shaft 12 simultaneously.

The cam plate 16 is an annular plate having a center bore 16A that receives the first surface 14E of the hub 14. The cam plate 16 is rotatably supported by the hub 14 allowing for relative rotation. The cam plate 16 has a plurality of distinct outer surface portions (most apparent in FIG. 1A) that each have either a constant diameter within the portion or a gradual diametrical change. For example, a first surface portion 16B has a constant diameter D4, a second surface portion 16C has a constant diameter D5, a third surface portion 16D has a gradually increasing diameter as the cam plate 16 rotates counterclockwise, and fourth surface portion 16E has a flat or planar tangential surface. The diameter D4 of the first surface portion 16B is smaller than the diameters of all other surface portions. The third surface portion 16D is disposed between and connects the surfaces of the second surface portion 16C and the fourth surface portion 16E. A smallest diameter D6 of the fourth surface portion 16E is larger than the diameter D5 of the second surface portion 16C.

The cam plate 16 also includes first and second radially extending surfaces 16F, 16G. The first radial surface 16F is disposed adjacent to the first surface portion 16B and includes a protrusion 16H. The second radial surface 16G is disposed between and connects the surfaces of the first surface portion 16B and the second surface portion 16C.

The lever plate 18 is an annular plate having a center bore 18A that receives the second surface 14F of the hub 14. The lever plate 18 also includes a first arm 18B, a second arm 18C, and a third arm 18D. More specifically, the first arm 18B extends radially outward from the center bore 18A and includes an end portion 18E that extends toward the cam plate 16. The end portion 18E includes a bottom or radially facing surface 18F that interacts with the second radial surface 16G of the cam plate 16. The first arm 18B also includes a pin 32 that extends in the opposite direction of the end portion 18E of the first arm 18B.

The second arm 18C of the lever plate 18 extends in a radial direction approximately 90° counterclockwise from the first arm 18B. The second arm 18C includes an end portion 18G having a slot 18H. The third arm 18D extends in a radial direction from the second arm 18C at approximately a 90° angle α. The third arm 18D includes an end portion 18J that extends slightly towards the cam plate 16. The end portion 18J has a surface 18K angled predominately parallel with the first surface 16F of the cam plate 16 and includes a protrusion 18L in alignment with the protrusion 16H of the cam plate 16. The compression spring 20 is disposed having a first end 20A in contact with the first surface 16F of the cam plate 16 such that the protrusion 16H extends into the compression spring 20. A second end 20B of the spring 20 is in contact with the surface 18K of the end portion 18J of the third arm 18D of the lever plate 18 such that the protrusion 18L extends into the compression spring 20.

The spring plate 22 includes a center bore 22A having a pair of flat surfaces 22B that receives the hub 14 disposing the spring plate 22 adjacent the lever plate 18 on the pair of flat surfaces 14K of the second surface 14F of the hub 14 thus allowing for the hub 14 and spring plate 22 to rotate in common. The spring plate 22 further includes radially extending first and second arms 22C, 22D which extend at approximately a 55° to 75° angle from each other. The arms 22C, 22D are further disposed such that the pin 32 of the lever plate 18 is captured between the first and second arms. The first arm 22C includes a small axial bore 22E and a flat radially facing surface 22F. The second arm 22D also includes a flat radially facing surface 22G that opposes the surface 22F of the first arm 22C. The arms 22C, 22D are further disposed such that the pin 32 of the lever plate 18 is captured between the surfaces 22F, 22G of the first and second arms. The spring 24 is axially aligned with the shaft 12 and includes a first end 24A disposed in the axial bore 22E of the first arm 22C of the spring plate 22. The spring provides a rotational force against the spring plate 22 in the counterclockwise rotational direction.

The manual release lever 30 is disposed proximate to the second end 12B of the shaft 12. More specifically, the release lever 30 includes a first end 30A and a second end 30B. The first end 30A includes a bore 30C having a pair of flat surfaces 30D and receives the second end 12B of the shaft 12 matching the flat surfaces of 30D of the release lever 30 with the flat surfaces 12E of the shaft 12 such that the release lever 20 and the shaft 12 rotate in common. The second end 30B of the release lever 30 includes a slot 30E.

Figure 2C:
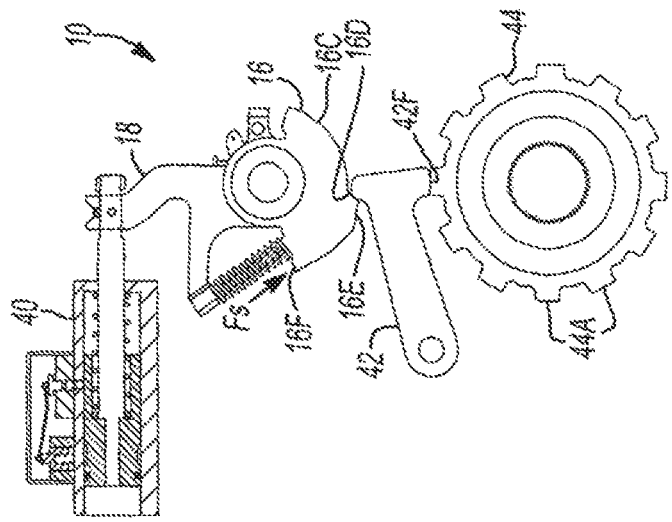
FIG. 2C is a front view of a parking pawl actuation assembly disposed in a third or interference position according to the principles of the present invention.
Figure 2B:
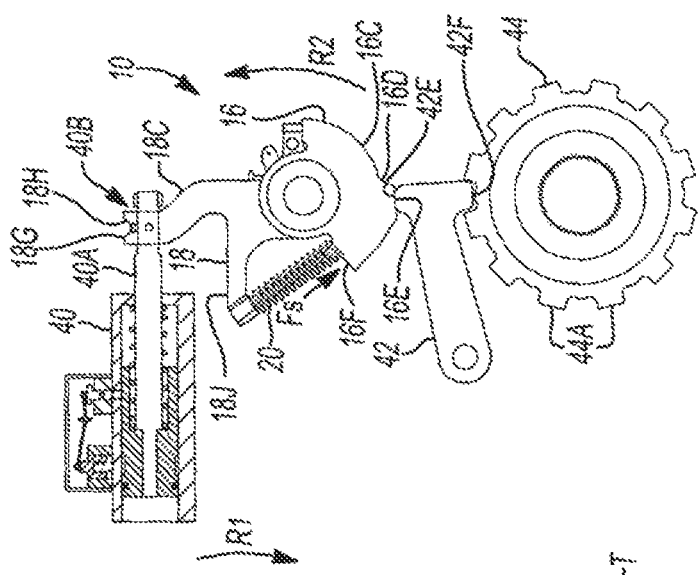
FIG. 2B is a front view of a parking pawl actuation assembly disposed in a second or locked position according to the principles of the present invention.
Figure 2A:
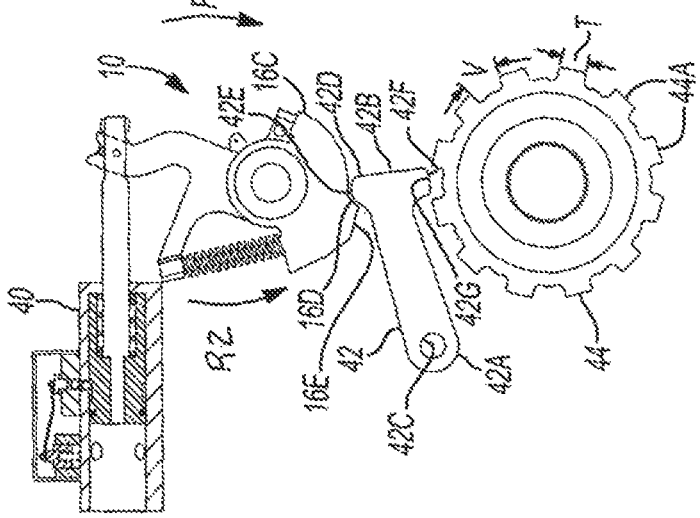
FIG. 2A is a front view of a parking pawl actuation assembly disposed in a first or unlocked position according to the principles of the present invention.
Figure 3:
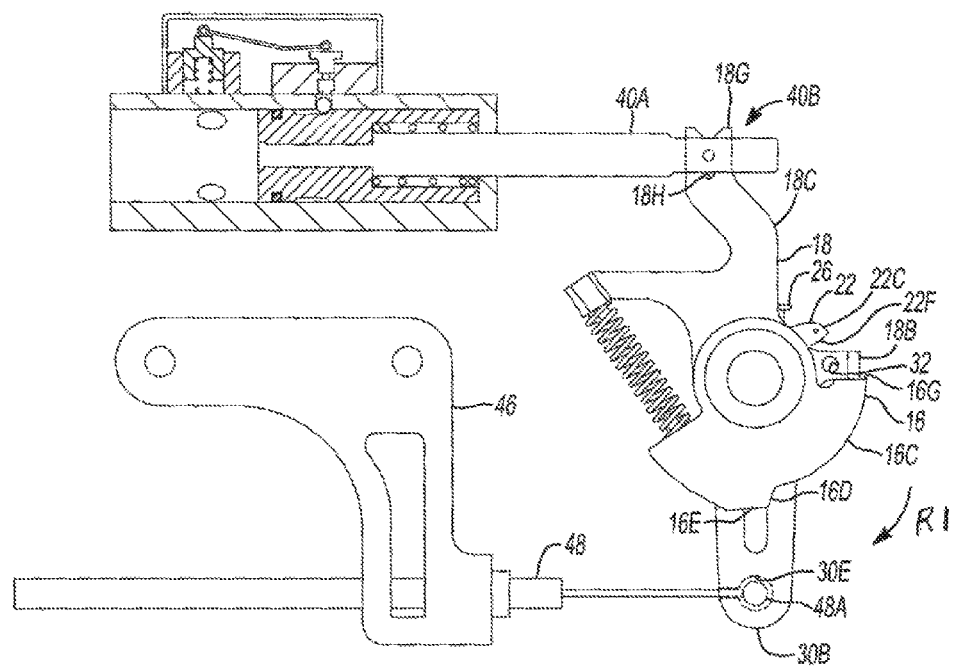
FIG. 3 is a front view of a parking pawl actuation assembly including both a mechanical actuator and a manual actuation cable according to the principles of the present invention.

Referring now to FIGS. 2A and 3, the parking pawl actuation assembly 10 and the transmission structural environment in which the assembly operates according to the principles of the present invention is illustrated and will now be described. The assembly 10 is arranged in the transmission along with an actuator 40, a parking pawl 42, and a parking gear 44. The actuator 40 is supported by the transmission housing (not shown) and may be pneumatically, hydraulically, or electrically actuated. However, the actuator may be one of many types of actuators without departing from the scope of the invention. The actuator includes a rod 40A that is linearly transferable and has an end 40B configured to engage the slot 18H of the end portion 18G of the second arm 18C of the lever plate 18. The parking gear 44 is rotatably supported by a shaft (not shown) and may be selectably connectable to the shaft or permanently fixed for common rotation with the shaft. The parking gear 44 includes a plurality of gear teeth 44A having a tooth thickness T approximately equal to the bottom land L. In the example shown in FIG. 2A, the parking gear 44 has 12 gear teeth. The parking pawl 42 has a first end 42A and a second end 42B. The first end 42A has a bore 42C through which a transmission house supported pivot pin (not shown) passes. The second end 42B includes a first portion 42D with a contact surface 42E and a second portion 42F extending in the opposite direction from the first portion 42D. The contact surface 42E is in constant contact with at least one of the plurality of surfaces 16C, 16D, 16E of the cam plate 16. The second portion 42F has a squared-off portion 42G and is configured to engage between the gear teeth 44A of the parking gear 44.

Referring now to FIGS. 2A-C, the operation of the parking pawl actuation assembly 10 for a transmission according to the principles of the present invention is illustrated and will now be described. In a first or disengaged position shown in FIG. 2A, the actuator rod 40A is fully extended rotating the lever plate 18 to a maximum position in a clockwise direction R1. The surface 18F of the first arm 18B of the lever plate 18 is in contact with the second radial surface 16G of the cam plate 16 and applies a force to the cam plate 16 rotating the cam plate 16 in the clockwise direction R1. The contact surface 42E of the parking pawl 42 is now in contact with the second surface portion 16C of the cam plate 16 which allows the parking pawl 42 to pivot such that the second portion 42F of the parking pawl is not engaged with the gear teeth 44A of the parking gear 44.

Referring specifically to FIG. 2B, a second or engaged position of the parking pawl actuation assembly 10 is illustrated and will now be described. The actuator rod 40A is fully retrieved rotating the lever plate 18 to a maximum position in a counterclockwise direction R2. The end portion 18J is angularly translated placing the spring 20 in compression which in turn applies a spring force Fs on the first radial surface 16F of the cam plate. With the application of the spring force Fs on the cam plate 16, the cam plate rotates in the counterclockwise direction R2, the contact surface 42E of the parking pawl maintains contact with first the second surface 16C, then the third surface 16D, and then the fourth surface 16E thus pivoting the parking pawl 42 and disposing the second portion 42F of the parking pawl 42 between a pair of gear teeth 44A of the parking gear 44 thus preventing the parking gear 44 from rotating.

Referring now to FIG. 2C, a third position of the parking pawl actuation assembly 10 is illustrated and will now be described. In the third position the parking gear 44 is rotated to a position such that the second portion 42F of the parking pawl 42 butts against an outer or top surface of one of the gear teeth 44A. In this position, the cam plate 16 does not rotate when the force Fs is applied to the second radial surface 16G by the lever plate 18. The compression spring 20 continues to apply the force Fs to the cam plate 16 until the parking gear 44 rotates to allow the second portion 42F of the parking pawl 42 to pivot between a pair of gear teeth. At that point, the cam plate 16 rotates and the third and fourth surfaces 16D, 16E urge the parking pawl 42 to engage the gear teeth 44A as shown in FIG. 2B.

Referring now to FIG. 3, a manual release operation of the parking pawl actuation assembly 10 is illustrated and will now be described. For example, a parking pawl actuation assembly 10 may include a manual release bracket and cable 46, 48. The bracket is securely fixed to the transmission housing and supports the cable 48. The cable 48 is manually operated by the operator. The cable 48 has an end 48A configured to couple to the slot 30E of the second end 30B of the release lever 30. When actuated, the cable 48 pulls the release lever 30 and in turn rotates the shaft 12 in the clockwise direction R1. The spring plate 22 also rotates clockwise since it is fixed for common rotation with the hub 14, shaft 12, and pin 26. The clockwise rotation of the spring plate 22 brings the surface 22F of the first arm 22C of the spring plate 22 in contact with the pin 32 of the first arm 18B of the lever plate 18. The first arm 22C of the spring plate 22 applies a rotational force to the first arm 18B of the lever plate 18 urging the lever plate to rotate in the clockwise direction R1 which in turn urges the cam plate 16 in the clockwise direction R1 through the first arm 18B of the lever plate 18 and the second radial surface 16G of the cam plate 16. Since the cam plate 16 is rotating in the clockwise direction R1, the contact surface 42E of the parking pawl 42 maintains contact with the cam plate 16 by sliding off the fourth surface 16E, radially inward on the third surface 16D, and onto the second surface 16C thus disengaging the parking pawl 42 from the parking gear 44.

The description of the invention is merely exemplary in nature and variations that do not depart from the general essence of the invention are intended to be within the scope of the invention. Such variations are not to be regarded as a departure from the spirit and scope of the invention.

What we claim is:

1. A parking pawl actuation assembly for a transmission, the assembly comprising:
    a shaft having a first and second end, and wherein the second end is rotatably supported by a transmission housing;
    a hub member having a first and second end, and wherein the hub member is rotatably supported by the shaft, the first end of the hub member is disposed proximate the first end of the shaft, and the second end of the hub member is disposed proximate the second end of the shaft;
    a cam plate rotatably supported by the hub member and disposed proximate the first end of the hub member;
    a lever plate rotatably supported by the hub member and disposed adjacent the cam plate;
    a first resilient member disposed between the cam plate and the lever plate, and wherein the resilient member applies a rotational force on the cam plate in a first rotational direction when the lever plate is rotated in the first rotational direction;
    an actuator configured to selectively rotate the lever plate to one of a plurality of positions, and
    a parking pawl member having a first end and a second end, and wherein the first end of the parking pawl member is pivotably supported by the transmission housing and the second end of the parking pawl member has a first portion configured to engage the cam plate and a second portion configured to engage a parking gear of the transmission.

2. The parking pawl actuator assembly of claim 1 wherein the shaft includes a flange, a narrow portion, and a flat portion, and wherein the flange is disposed on the first end, the flat portion is disposed proximate the second end, and the narrow portion is disposed between the first and second ends and includes a bore having an axis perpendicular to an axis of the shaft.

3. The parking pawl actuator assembly of claim 1 wherein the hub member includes a axial bore, a radial bore, a flange, a first surface, and a second surface, and wherein the axial bore receives the shaft, flange is disposed on the first end, the first surface is disposed proximate the flange, the second surface is disposed proximate the second end and the radial bore intersects the second surface and has an axis perpendicular to the axis of the hub member.

4. The parking pawl actuator assembly of claim 1 wherein the cam plate includes an outer perimeter surface having a first, a second, a third, and a fourth portion, and wherein the diameter of the first portion is a constant value, the diameter of the second portion is a constant value that is larger than the diameter of the first portion, the diameter of the fourth portion varies and forms a planar surface, and the diameter of the third portion varies from the diameter of the second portion to the diameter of an adjacent edge of the fourth portion.

5. The parking pawl actuator assembly of claim 4 wherein the cam plate further includes a first and second radially extending surface, and wherein the first radial surface is disposed adjacent the first portion and includes a protrusion, and the second radial surface is disposed adjacent the first portion and the second portion.

6. The parking pawl actuator assembly of claim 1 wherein the lever plate includes a first, a second, and a third arm, and wherein the first arm extends radially outward from the hub member and includes an end portion that extends toward the cam plate, the second arm extends in a radial direction at approximately 90° from the first arm, and the third arm extends from the second arm and includes an end portion that extends towards the cam plate and includes a protrusion.

7. The parking pawl actuator assembly of claim 6 wherein the first arm of the lever plate includes a pin disposed extending in an axially direction opposite the cam plate.

8. The parking pawl actuator assembly of claim 1 further comprising a spring plate fixed for common rotation with the hub member wherein the spring plate includes a first and a second arm extending radially at an angle of approximately 55° to 75°.

9. The parking pawl actuator assembly of claim 1 further comprising a release member disposed on the shaft proximate the second end of the shaft wherein the release member has a first and a second end, and wherein the first end includes a bore that receives the shaft, and the second end is configured to receive a manually operated cable.

10. The parking pawl actuator assembly of claim 1 wherein the lever plate is selectively rotated by the actuator to one of a first, a second, and a third of the plurality of positions, and wherein the first position includes the lever plate and the cam plate rotated in the second rotational direction, the first portion of the parking pawl is in contact with the second surface portion of the cam plate, and the second portion of the parking pawl is separated from the parking gear.

11. The parking pawl actuator assembly of claim 10 wherein the second of the plurality of positions includes the lever plate and the cam plate rotated in the first rotational direction, the first portion of the parking pawl is in contact with the fourth surface portion of the cam plate, and the second portion of the parking pawl is disposed between a pair of gear teeth of the parking gear.

12. The parking pawl actuator assembly of claim 11 wherein the third of the plurality of positions includes the lever plate rotated in the second rotational direction, the first portion of the parking pawl is in contact with the third surface portion of the cam plate, and the second portion of the parking pawl is in contact with a top surface of a gear tooth of the parking gear.

13. A parking pawl actuation assembly for a transmission, the assembly comprising:
    a shaft having a first and second end, and wherein the second end is rotatably supported by a transmission housing;
    a hub member having a first and second end, and wherein the hub member is rotatably supported by the shaft, the first end of the hub member is disposed proximate the first end of the shaft, and the second end of the hub member is disposed proximate the second end of the shaft;
    a cam plate rotatably supported by the hub member and disposed proximate the first end of the hub member;
    a lever plate rotatably supported by the hub member and disposed adjacent the cam plate;
    a first resilient member disposed between the cam plate and the lever plate, and wherein the resilient member applies a rotational force on the cam plate in a first rotational direction when the lever plate is rotated in the first rotational direction;
    an actuator configured to selectively rotate the lever plate to one of a plurality of positions;
    a parking pawl member having a first end and a second end, and wherein the first end of the parking pawl member is pivotably supported by the transmission housing and the second end of the parking pawl member has a first portion configured to engage the cam plate and a second portion configured to engage a parking gear of the transmission;
    a spring plate fixed for common rotation with the hub member and disposed adjacent the lever plate;
    a second resilient member disposed between the transmission housing and the spring plate, the second resilient member having a first and a second end, the first end configured to engage the spring plate and the second end configured to engage the housing of the transmission, and wherein the second resilient member applies a detent force to the spring plate when the spring plate is rotated, and
    a release member disposed on the shaft proximate the second end of the shaft, and wherein the release member is configured to engage the shaft for common rotation; and
    wherein the shaft and the hub member are fixed for common rotation, the spring plate is configured to engage the lever plate for common rotation when the spring plate is rotated in a second rotational direction opposite the first rotational direction and the lever plate is configured to engage the cam plate for common rotation when the lever plate is rotated in the second rotational direction.

14. The parking pawl actuator assembly of claim 13 wherein the shaft includes a flange, a narrow portion, and a flat portion, and wherein the flange is disposed on the first end, the flat portion is disposed proximate the second end, and the narrow portion is disposed between the first and second ends and includes a bore having an axis perpendicular to an axis of the shaft.

15. The parking pawl actuator assembly of claim 14 wherein the hub member includes a axial bore, a radial bore, a flange, a first surface, and a second surface, and wherein the axial bore receives the shaft, flange is disposed on the first end, the first surface is disposed proximate the flange, the second surface is disposed proximate the second end and the radial bore intersects the second surface and has an axis perpendicular to the axis of the hub member.

16. The parking pawl actuator assembly of claim 15 wherein the cam plate includes an outer perimeter surface having a first, a second, a third, and a fourth portion, and wherein the diameter of the first portion is a constant value, the diameter of the second portion is a constant value that is larger than the diameter of the first portion, the diameter of the fourth portion varies and forms a planar surface, and the diameter of the third portion varies from the diameter of the second portion to the diameter of an adjacent edge of the fourth portion.

17. The parking pawl actuator assembly of claim 16 wherein the cam plate further includes a first and second radially extending surface, and wherein the first radial surface is disposed adjacent the first portion and includes a protrusion, and the second radial surface is disposed adjacent the first portion and the second portion.

18. The parking pawl actuator assembly of claim 17 wherein the lever plate includes a first, a second, and a third arm, and wherein the first arm extends radially outward from the hub member and includes an end portion that extends toward the cam plate, the second arm extends in a radial direction at approximately 90° from the first arm, and the third arm extends from the second arm and includes an end portion that extends towards the cam plate and includes a protrusion.

19. The parking pawl actuator assembly of claim 18 wherein the first resilient member is a coil spring having a first and a second end, and wherein the coil spring is disposed having the first end in contact with the first radial surface of the cam plate and the second end in contact with the end portion of the third arm of the lever plate.

20. The parking pawl actuator assembly of claim 18 wherein the first arm of the lever plate includes a pin disposed extending in an axially direction opposite the cam plate.

21. The parking pawl actuator assembly of claim 20 wherein the spring plate includes a first and a second arm extending radially at an angle of approximately 55° to 75°, and the spring plate is further disposed having the pin of the lever plate is between the first and second arms of the spring plate.

22. The parking pawl actuator assembly of claim 21 wherein the release member has a first and a second end, and wherein the first end includes a bore that receives the shaft, and the second end is configured to receive a manually operated cable.

23. The parking pawl actuator assembly of claim 13 wherein the lever plate is selectively rotated by the actuator to one of a first, a second, and a third of the plurality of positions, and wherein the first position includes the lever plate and the cam plate rotated in the second rotational direction, the first portion of the parking pawl is in contact with the second surface portion of the cam plate, and the second portion of the parking pawl is separated from the parking gear.

24. The parking pawl actuator assembly of claim 23 wherein the a second of the plurality of positions includes the lever plate and the cam plate rotated in the first rotational direction, the first portion of the parking pawl is in contact with the fourth surface portion of the cam plate, and the second portion of the parking pawl is disposed between a pair of gear teeth of the parking gear.

25. The parking pawl actuator assembly of claim 24 wherein the third of the plurality of positions includes the lever plate rotated in the second rotational direction, the first portion of the parking pawl is in contact with the third surface portion of the cam plate, and the second portion of the parking pawl is in contact with a top surface of a gear tooth of the parking gear.

26. A parking pawl actuation assembly for a transmission, the assembly comprising:
  a shaft having a first and second end, and wherein the second end is rotatably supported by a transmission housing;
  a hub member having a first and second end, and wherein the hub member is rotatably supported by the shaft, the first end of the hub member is disposed proximate the first end of the shaft, and the second end of the hub member is disposed proximate the second end of the shaft;
  a cam plate rotatably supported by the hub member and disposed proximate the first end of the hub member;
  a lever plate rotatably supported by the hub member and disposed adjacent the cam plate;
  a first resilient member disposed between the cam plate and the lever plate, and wherein the resilient member applies a rotational force on the cam plate in a first rotational direction when the lever plate is rotated in the first rotational direction, and the lever plate is engaged for common rotation with the cam plate when the lever plate is rotated in a second rotational direction;
  an actuator configured to selectively rotate the lever plate to one of a first, a second, and a third position;
  a parking pawl member having a first end and a second end, and wherein the first end of the parking pawl member is pivotably supported by the transmission housing and the second end of the parking pawl member has a first portion configured to engage the cam plate and a second portion configured to engage a parking gear of the transmission;
  a spring plate fixed for common rotation with the hub member and disposed adjacent the lever plate;
  a second resilient member disposed between the transmission housing and the spring plate, the second resilient member having a first and a second end, the first end configured to engage the spring plate and the second end configured to engage the transmission housing, and wherein the second resilient member applies a detent force to the spring plate when the spring plate is rotated, and
  a release member disposed on the shaft proximate the second end of the shaft, and wherein the release member is configured to engage the shaft for common rotation; and
  wherein the shaft and the hub member are fixed for common rotation, the spring plate is configured to engage the lever plate for common rotation when the spring plate is rotated in a second rotational direction opposite the first rotational direction and the lever plate is configured to engage the cam plate for common rotation when the lever plate is rotated in the second rotational direction.

27. The parking pawl actuator assembly of claim 26 wherein the shaft includes a flange, a narrow portion, and a flat portion, and wherein the flange is disposed on the first end, the flat portion is disposed proximate the second end, and the narrow portion is disposed between the first and second ends and includes a bore having an axis perpendicular to an axis of the shaft.

28. The parking pawl actuator assembly of claim 27 wherein the hub member includes a axial bore, a radial bore, a flange, a first surface, and a second surface, and wherein the axial bore receives the shaft, flange is disposed on the first end, the first surface is disposed proximate the flange, the second surface is disposed proximate the second end and the radial bore intersects the second surface and has an axis perpendicular to the axis of the hub member.

29. The parking pawl actuator assembly of claim 28 wherein the cam plate includes an outer perimeter surface having a first, a second, a third, and a fourth portion, and wherein the diameter of the first portion is a constant value, the diameter of the second portion is a constant value that is larger than the diameter of the first portion, the diameter of the fourth portion varies and forms a planar surface, and the diameter of the third portion varies from the diameter of the second portion to the diameter of an adjacent edge of the fourth portion.

30. The parking pawl actuator assembly of claim 29 wherein the cam plate further includes a first and second radially extending surface, and wherein the first radial surface is disposed adjacent the first portion and includes a protrusion, and the second radial surface is disposed adjacent the first portion and the second portion.

31. The parking pawl actuator assembly of claim 30 wherein the lever plate includes a first, a second, and a third arm, and wherein the first arm extends radially outward from the hub member and includes an end portion that extends toward the cam plate, the second arm extends in a radial direction at approximately 90° from the first arm, and the third arm extends from the second arm and includes an end portion that extends towards the cam plate and includes a protrusion.

32. The parking pawl actuator assembly of claim 31 wherein the first resilient member is a coil spring having a first and a second end, and wherein the coil spring is disposed having the first end in contact with the first radial surface of the cam plate and the second end in contact with the end portion of the third arm of the lever plate.

33. The parking pawl actuator assembly of claim 32 wherein the first arm of the lever plate includes a pin disposed extending in an axially direction opposite the cam plate.

34. The parking pawl actuator assembly of claim 33 wherein the spring plate includes a first and a second arm extending radially at an angle of approximately 55° to 75°, and the spring plate is further disposed having the pin of the lever plate is between the first and second arms of the spring plate.

35. The parking pawl actuator assembly of claim 34 wherein the release member has a first and a second end, and wherein the first end includes a bore that receives the shaft, and the second end is configured to receive a manually operated cable.

36. The parking pawl actuator assembly of claim 35 wherein the first position includes the lever plate and the cam plate rotated in the second rotational direction, the first portion of the parking pawl is in contact with the second surface portion of the cam plate, and the second portion of the parking pawl is separated from the parking gear.

37. The parking pawl actuator assembly of claim 36 wherein the second position includes the lever plate and the cam plate rotated in the first rotational direction, the first portion of the parking pawl is in contact with the fourth surface portion of the cam plate, and the second portion of the parking pawl is disposed between a pair of gear teeth of the parking gear.

38. The parking pawl actuator assembly of claim 37 wherein the third position includes the lever plate rotated in the second rotational direction, the first portion of the parking pawl is in contact with the third surface portion of the cam plate, and the second portion of the parking pawl is in contact with a top surface of a gear tooth of the parking gear.

* * * * *